US011517973B2

(12) United States Patent
Eissara

(10) Patent No.: US 11,517,973 B2
(45) Date of Patent: Dec. 6, 2022

(54) WELDING ELEMENT AND WELDING METHOD FOR CONNECTING A WELD ELEMENT TO A WORKPIECE

(71) Applicant: NEWFREY LLC, New Britain, CT (US)

(72) Inventor: Bah Eissara, Giessen (DE)

(73) Assignee: NEWFREY LLC, New Britain, CT (US)

( * ) Notice: Subject to any disclaimer, the term of this patent is extended or adjusted under 35 U.S.C. 154(b) by 336 days.

(21) Appl. No.: 16/526,155

(22) Filed: Jul. 30, 2019

(65) Prior Publication Data

US 2019/0351502 A1 Nov. 21, 2019

Related U.S. Application Data

(63) Continuation of application No. PCT/EP2018/051916, filed on Jan. 26, 2018.

(30) Foreign Application Priority Data

Jan. 30, 2017 (EP) ..................................... 17153807

(51) Int. Cl.
*B23K 9/20* (2006.01)
*B23K 11/00* (2006.01)
(Continued)

(52) U.S. Cl.
CPC .......... *B23K 9/207* (2013.01); *B23K 11/0053* (2013.01); *B23K 11/166* (2013.01); *B23K 35/0288* (2013.01); *F16B 37/061* (2013.01)

(58) Field of Classification Search
CPC .............. B23K 11/0053; B23K 11/166; B23K 20/1295; B23K 35/0288; B23K 9/207; B23K 11/11; B23K 11/14; F16B 37/061
(Continued)

(56) References Cited

U.S. PATENT DOCUMENTS 7,452,171 B2 * 11/2008 Albrecht ................ B23K 9/207
219/98
8,987,631 B2 * 3/2015 Wang .................. B23K 11/0053
219/93
(Continued)

FOREIGN PATENT DOCUMENTS

CN       1450278 A     10/2003
CN     101850461 A     10/2010
(Continued)

OTHER PUBLICATIONS

International Preliminary Report dated Aug. 8, 2019.
(Continued)

*Primary Examiner* — Dana Ross
*Assistant Examiner* — James F Sims, III
(74) *Attorney, Agent, or Firm* — Michael P. Leary

(57) ABSTRACT

A welding element is operable for being connected to a workpiece using a welding method. The welding element comprises: a head and a shaft like anchor portion. The head includes a welding surface, a stop surface that is remote from the welding surface, and a plurality of pointed projections evenly and uniformly distributed over the entire welding surface. The shaft-like anchor portion extends along a longitudinal axis between a first end region and a second end region, with the first end region connected to the stop surface.

22 Claims, 3 Drawing Sheets

(51) Int. Cl.
B23K 11/16 (2006.01)
B23K 35/02 (2006.01)
F16B 37/06 (2006.01)

(58) Field of Classification Search
USPC .......................................... 219/125.1, 93, 98
See application file for complete search history.

(56) References Cited

U.S. PATENT DOCUMENTS

| | | | |
|---|---|---|---|
| 10,646,952 | B2 | 5/2020 | Aoyama et al. |
| 2005/0111932 | A1 | 5/2005 | Albrecht et al. |
| 2007/0251979 | A1 | 11/2007 | Mauer |
| 2011/0290859 | A1 | 12/2011 | Delsman et al. |

FOREIGN PATENT DOCUMENTS

| | | |
|---|---|---|
| CN | 102308374 A | 1/2012 |
| CN | 102689086 A | 9/2012 |
| CN | 103357999 A | 10/2013 |
| DE | 102013225048 A | 6/2015 |
| EP | 1060822 A | 12/2000 |
| EP | 1806200 A | 7/2007 |
| EP | 1806200 A1 * | 7/2007 ........... B23K 11/166 |
| JP | 49-026160 A | 3/1974 |
| JP | 5-23857 A | 2/1993 |
| JP | 2012179646 A | 9/2012 |
| JP | 2015030038 A | 2/2015 |
| KR | 20070031461 A | 3/2007 |

OTHER PUBLICATIONS

JP Office Action dated Feb. 28, 2022 cited in corresponding Japanese Application No. 2019-541266.
Korean Office Action dated Feb. 12, 2022 cited in corresponding KR Patent Application No. 10-2019-7022281.
Office Action dated Oct. 4, 2021 cited in corresponding Japanese Application No. 2019-541266.
European Search Report dated Nov. 26, 2021 cited in corresponding EP Patent Application No. 21189187.4.
Office Action dated Nov. 12, 2021 cited in corresponding Chinese Application No. 201880009314.4.
Korean Office Action dated Aug. 23, 2022 cited in corresponding KR Patent Application No. 10-2019-7022281.

* cited by examiner

WELDING ELEMENT AND WELDING METHOD FOR CONNECTING A WELD ELEMENT TO A WORKPIECE

CROSS-REFERENCE TO RELATED APPLICATIONS

This application is a continuation of international application PCT/EP2018/051916, filed Jan. 26, 2018 which claims priority from European Patent Application No. 17153807.7 filed Jan. 30, 2017, the disclosures of which are incorporated herein by reference in their entirety.

BACKGROUND OF THE INVENTION

The present invention relates to a welding element, in particular a welding stud, which is suitable for being connected to a workpiece using a welding method and comprises a head having a welding surface and a stop surface (or abutment surface) that is remote from the welding surface, and a shaft-like anchor portion that extends along a longitudinal axis between a first end region and a second end region, the first end region being connected to the stop surface.

The invention also relates to a welding method for connecting a corresponding welding element to a workpiece.

It is known in particular in vehicle body construction to use welding elements in order to attach components. For this purpose, welding studs are primarily used, which are fastened to a structure in a known manner, for example by stud welding. Various welding techniques are available for attaching welding elements of this kind, such as arc stud welding. The arc stud welding method is one of the arc pressure welding methods and is used to permanently connect an element such as a welding stud, a pin, a bush, a hook or an eye to a corresponding, larger component such as a vehicle body sheet, a housing, a workpiece, or similar. The head of the welding element is arranged on a workpiece or component and is then welded.

When connecting the welding element or welding stud to the workpiece surface, it has to be ensured that the melting and thus also the welding is even.

DE2227384A1 discloses a fastening element comprising a head and a shaft-like anchor portion connected to the head. The fastening element has, on the surface thereof to be connected to the component, a plurality of raised portions that are arranged symmetrically around the centre of said surface and project outwardly therefrom in the manner of a star. JPH0523857, US2005111932, DE102013225048 and EP1060822 disclose an element having a flange and a plurality of projections provided on the flange. However, the projections disclosed in these documents are not evenly and uniformly distributed over a welding surface. Thus they are not able to provide an evenly and uniformly welding of the welding surface on a workpiece.

In many fields of technology, as a result of space-saving considerations, aluminium alloys and/or high-strength or maximum-strength vehicle body sheets having a tensile strength of up to 1500 MPa and various sheet thicknesses (thick and thin sheet thicknesses) have become prevalent as materials, for example in lightweight vehicle bodies for cars, but also in other fields of industry. The strength of the sheets and the various sheet thicknesses depend on the function of the vehicle body component. The varying strength is problematic, since it is not possible to use the same welding elements for each sheet thickness.

The problem addressed by the present invention is therefore that of overcoming, at least in part, the above-described disadvantages in a welding element. In particular, the problem addressed by the present invention is that of providing a welding element and a welding method by means of which it is possible to advantageously permanently connect a welding element to a workpiece in a simple and cost-effective manner, and which allows for improved flexibility and a low risk of through-welding of the sheet, the strength of the welded connection being largely consistent with that of known welding elements and welding methods, and preferably even being capable of being increased.

BRIEF SUMMARY OF THE INVENTION

The above-mentioned problem is solved by a welding stud having the features of claim 1.

A welding element of this kind, which is suitable for being connected to a workpiece using a welding method, comprises a head having a welding surface and a stop surface that is remote from the welding surface, and a shaft-like anchor portion that extends along a longitudinal axis between a first end region and a second end region, the first end region being connected to the stop surface, characterised in that the welding surface comprises a plurality of pointed projections evenly and uniformly distributed over the entire welding surface. Thus, the entire welding surface is covered by projections.

The term "pointed" is intended to mean a shape that has a sharp or rounded tip, or a sharp or rounded corner.

By means of this welding surface geometry, a welding characteristic curve can be adapted to both thin and thick sheet thicknesses. This geometry offers the option of preventing the risk of through-welding in the case of thin sheets.

According to a further embodiment, the plurality of projections extend along a plurality of straight lines uniformly distributed over the welding surface. Eventually, the projections are arranged in parallel rows and are separated by two groups of intersecting grooves. Two projections are clearly demarcated, and separations of this kind can be formed without great effort. More particularly, the projections are arranged along a plurality of straight lines. The grooves of the first group extend parallel to each other. The grooves of the second group extend parallel to each other. The grooves of the first group are perpendicular to the grooves of the second group.

In an embodiment, the welding surface forms a bulge and the projections are arranged on the bulge. The projections extend over a limited region, which simplifies the welding of the welding element.

In a further embodiment, the bulge has a circular cross section. The bulge is centred on the longitudinal axis.

In an embodiment, each projection has a pyramid-like shape comprising a square base. The shape of the projection allows effective and targeted melting. In addition, the shape of the projection is easily produced, in particular by embossing. In another embodiment, protuberances or conical raised portions can be provided.

In an embodiment, each projection comprises four flat lateral surfaces, and two opposing lateral surfaces are enclosed by an angle of between 75 and 85 degrees. Such an angle allows for effective and targeted melting.

According to a further embodiment, the points (tips) of two adjacent projections (26) are mutually spaced by between 0.5 millimetres and 2.0 millimetres. This spacing allows for effective ignition of all points and even melting over the entire welding surface.

In an embodiment, the projections are produced by a suitable cold-forming method when the welding element is formed. No further steps are required in order to produce the projections. The projections are integral with the head.

Furthermore, the above-mentioned problem is solved by a welding method for connecting a welding element to a workpiece, which method comprises the following steps:
 providing a welding element as described above,
 providing a workpiece comprising a first and a second surface, and having a sheet thickness,
 providing a welding device,
 arranging the welding surface of the welding element on the first surface of the workpiece,
 actuating the welding device depending on the sheet thickness,
 welding the welding element to the workpiece by melting at least some of the projections and pressing the welding element against the workpiece.

In an embodiment, the projections have a projection height along the longitudinal axis thereof that is dependent on the sheet thickness.

In an embodiment, the second surface of the workpiece is provided with a zinc layer. A method of this kind only has a minimal impact on the zinc layer on the rear of the base material.

It goes without saying that the features mentioned above and to be explained in the following can be used not only in the relevant stated combination, but also in other combinations or in isolation, without departing from the scope of the present invention.

BRIEF DESCRIPTION OF THE DRAWINGS

Embodiments of the invention are shown in the drawings and are explained in more detail in the following description. In the drawings.

DETAILED DESCRIPTION OF THE PREFERRED EMBODIMENTS

Figure 1:
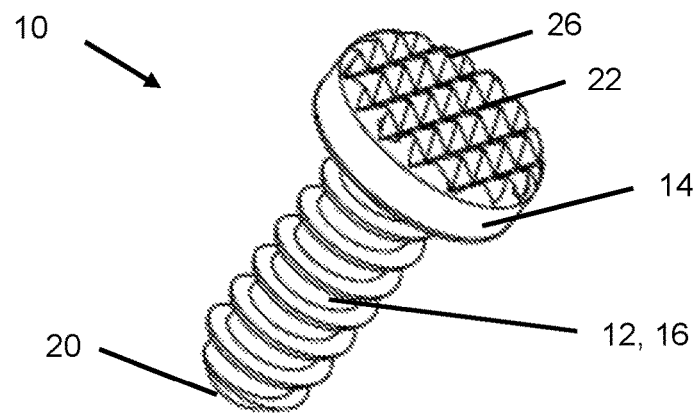
FIG. 1 is a perspective, schematic view of a welding element according to the invention, comprising a head and an anchor portion, the head having a first surface structure.

FIG. 1 shows a welding element 10, designed as a welding stud, comprising a shaft-like anchor portion 12 and a head 14 (or stud head).

The shaft-like anchor portion 12 has a main body 16, a first and a second end region 18, 20.

Figure 2:
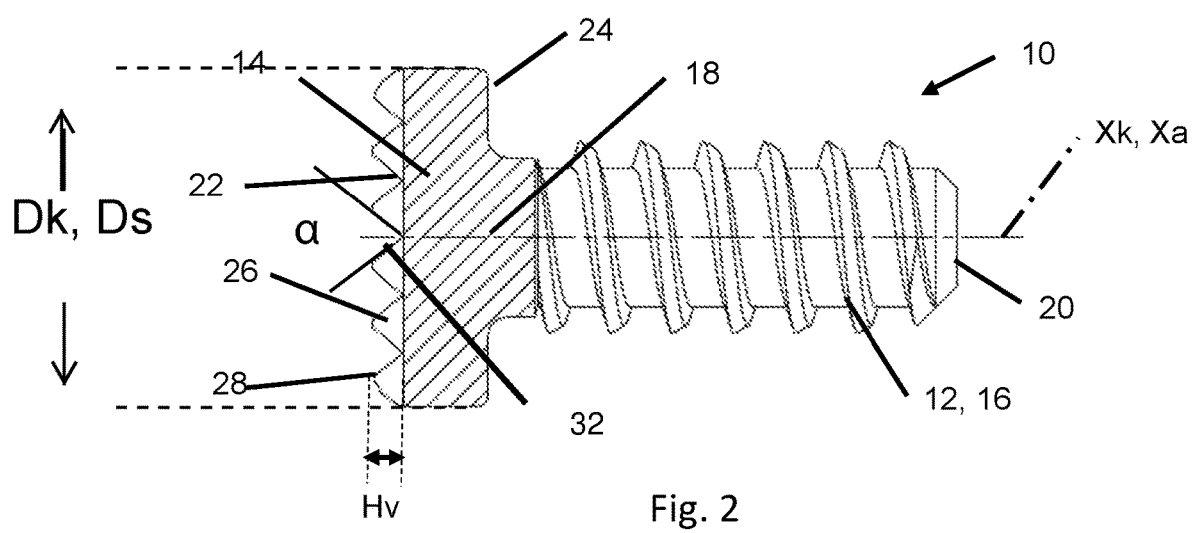
FIG. 2 is a side view of the welding element from FIG. 1.
Figure 4:
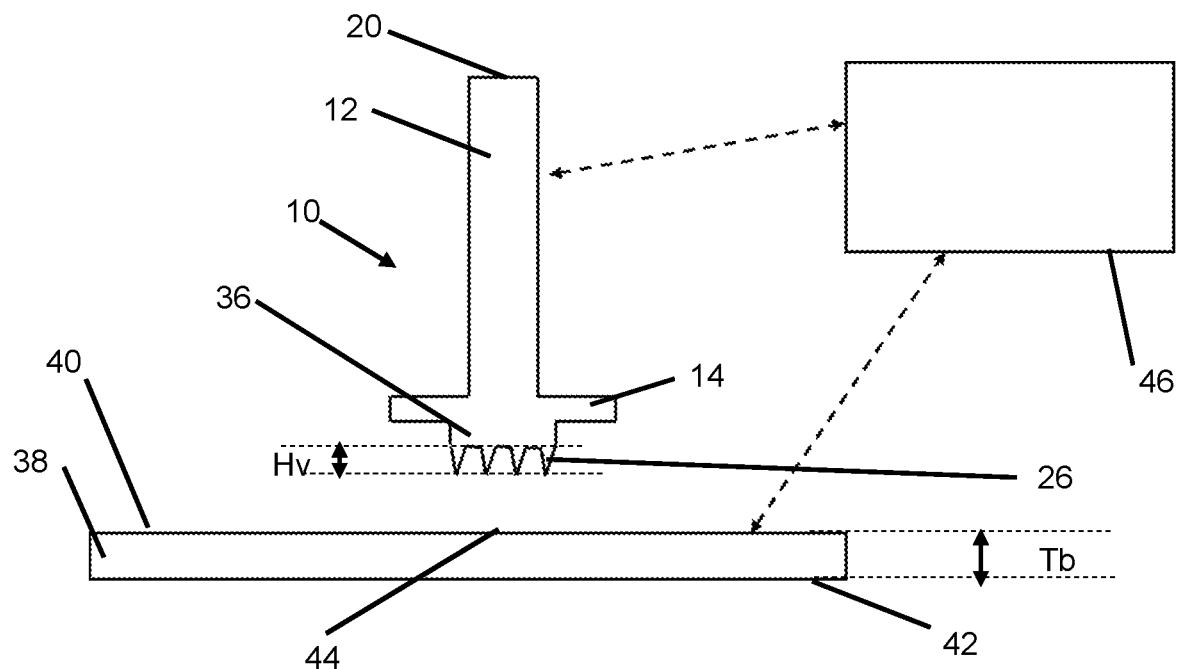
FIG. 4 is a longitudinal sectional view of an embodiment of a welding element according to the invention, arranged on a surface of a workpiece, and shows a schematic welding device.

The main body 16 extends along a longitudinal axis Xa between the first end region 18 and the second end region 20. The main body 16 of the anchor portion 12 can in each case assume the desired shaft shape. As shown in FIG. 1, FIG. 2 and FIG. 4, the main body 16 can have a circular cross section, which is substantially constant over the length thereof. In other embodiments, the anchor portion could also have a rectangular, triangular or trilobular cross section.

Likewise, in other embodiments, the main body 16 may not be constant over the length thereof.

The welding element 10 shown in FIG. 1 is advantageously a substantially cylindrical connection element, the anchor portion 12 of which comprises a thread. With respect to the welding element 10 according to FIG. 1 and FIG. 2, it should also be noted that the welding studs shown here are each provided with threads at the anchor portions 12 thereof, which is only intended to indicate that, after welding, the welding studs in question can of course be provided with a threaded assembly for screwing on an additional component or for other purposes. Various thread forms and thread sizes can be provided.

The second end region 20 of the anchor portion 12 is preferably rounded, but end regions having other shapes could also be provided. For example, the second end region may be provided with a cutting edge.

The head 14 extends from the first end region 18. The head 14 is for example circular and oriented concentrically relative to a head axis Xk. The head axis Xk and the longitudinal axis Xa coincide, for example. The head 14, which is advantageously in the shape of a disc (or a flange), comprises a welding surface 22 and a stop surface 24 that is remote from the welding surface 22. The spacing along the longitudinal axis Xa between the welding surface 22 and the stop surface 24 forms the thickness of the head 14. The greater the spacing, the thicker the head. The first end region 18 of the anchor portion 12 is connected to the stop surface 24. The head 14 has the welding surface 22 on the side thereof that is remote from the anchor portion 12.

The welding surface 22 extends for example in a plane (or is reasonably flat). In another embodiment (not illustrated), the welding surface 22 can have two welding portions, which together form an angle of 7 degrees or 9 degrees.

As shown in FIG. 2, the stop surface 24 has for example a head diameter Dk that is greater than that of the anchor portion. The welding surface can also be circular and can have a welding diameter Ds. The head diameter Dk and the welding diameter Ds can coincide, as shown in FIG. 2.

In another embodiment, the head diameter Dk can be greater than the welding diameter Ds, as shown in FIG. 4. The welding surface 22 can in this case be provided so as to be centred on the stop surface 24.

Figure 5:
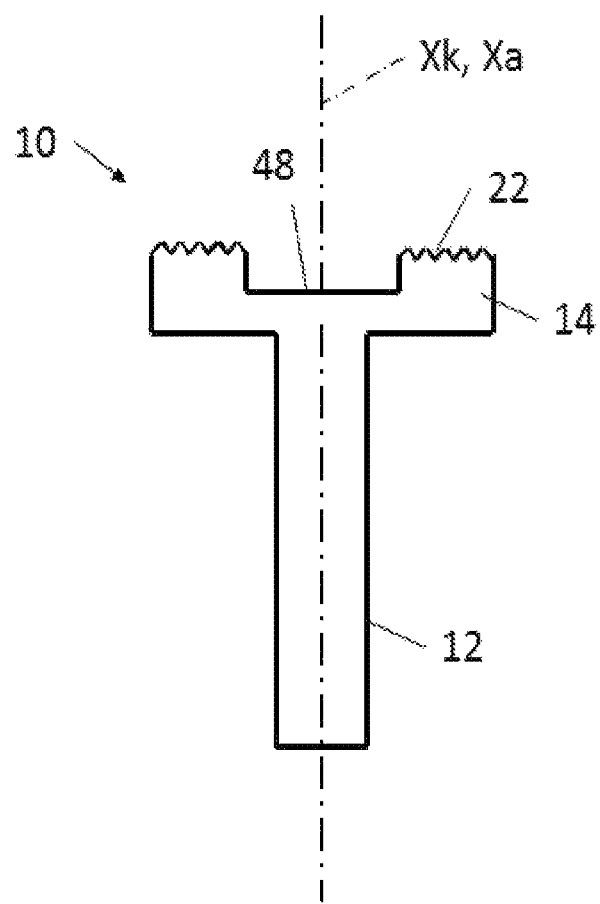
FIG. 5 is a side view of a welding element according to a further embodiment.

As shown in FIG. 5, in another embodiment, the welding surface 22 can be annular and can form a collar, such that the stop surface comprises a recess 48 that is oriented concentrically relative to the head axis Xk.

As can be seen in FIG. 1, FIG. 2, FIG. 3, FIG. 4 and FIG. 5, the welding surface 22 of the head 14 is not level, but is provided with a plurality of projections 26.

In particular, a "projection" is intended to mean a head portion or a head part that protrudes from the welding surface 22, such as a raised portion, a hump, etc.

The projections 26 are pointed. "Pointed" is intended to mean a shape which forms an edge, a tip or a corner. The points 28 of the projection 26 may be sharp or rounded. Preferably, the points 28 of the projection 26 are rounded in order to simplify storage and transport. In particular, the welding elements having rounded points do not damage the packaging for their transport. The points form a free end of the projection. The projection extends along the longitudinal axis Xa from the point as far as a base 30, which lies on a support of the head. The support is wider than the point.

The projections 26 are made of material that can melt in the electric arc.

The projections 26 are arranged so as to be evenly distributed over the welding surface 22. Each projection 26 has for example a substantially pyramid-like shape, comprising a square base 30 and four substantially flat lateral surfaces 32 which form the point 28. The four lateral surfaces 32 converge to form the point 28.

Preferably, two opposing lateral surfaces 32 are enclosed by an angle α of between 70 and 90 degrees, in particular between 75 and 85 degrees. Two opposing lateral surfaces 32 can be enclosed by an angle α of approximately 80 degrees. Such an angle allows for effective distribution of the projections while at the same time ensuring that the welding element (or welding surface) can be produced in a simple manner.

The angle α between two opposing lateral surfaces 32 of a projection 26 can be the same as or different from the angle α between the two other opposing lateral surfaces 32. The distance between two adjacent projections 26 (in particular between two points 28 of two adjacent projections 26) can be between 0.5 millimetres (mm) and 2.0 millimetres (mm).

In another embodiment (not shown), each projection comprises protuberances or conical raised portions.

Each projection 26 has a projection height Hv along the longitudinal axis Xa. The projection height Hv of all projections 26 can be the same. In another embodiment, the projections 26 have different projection heights Hv. For example, the projection heights Hv can be between 0.2 and 1.1 millimetres (mm), and in particular between 0.3 and 1.0 millimetres (mm). The projection heights Hv can preferably be 0.3 millimetres.

Figure 3:
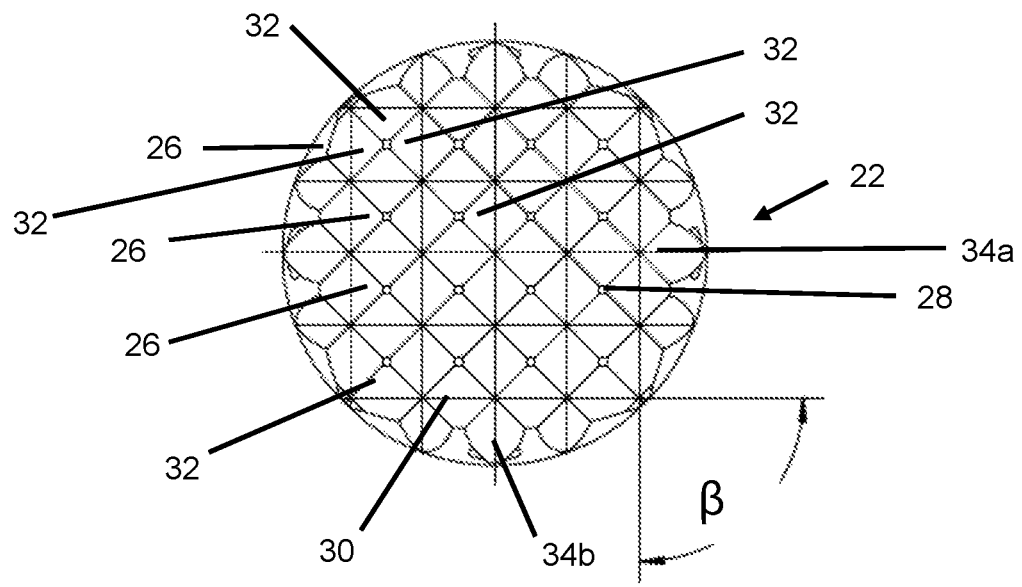
FIG. 3 is a plan view of the surface structure of the welding element from FIG. 1.

The projections 26 are oriented in parallel rows, as shown in FIG. 3. Preferably, the projections 26 are separated by two groups of intersecting grooves 34a, 34b (or lines). The first group of grooves 34a (or lines) may for example be orthogonal to the second group of grooves 34b (or lines). In another embodiment, the first group of grooves 34a (or lines) can form an angle β of greater or less than 90 degrees together with the second group of grooves 34b.

The projections 26 substantially form a "waffle-shaped pattern". The projections 26 can be oriented so as to have different gradients, depths and extensions.

The welding surface 22 forms for example a bulge 36, and the projections 26 can be arranged on the bulge 36. For example, the bulge 36 has a circular cross section. The bulge 36 can be arranged so as to be centred on the longitudinal axis Xa.

In another embodiment, the welding element 10 does not comprise a bulge, and the welding surface 22 forms a flat plane that is opposite the stop surface.

In a further embodiment, the welding surface 22 is annular and the projections 26 form a collar around the head axis Xk.

The welding element 10 is for example made of a single material. In other embodiments, the welding element 10 could for example consist of a plurality of materials. The welding element 10 is preferably made of steel or stainless steel. Other metals such as aluminium or other materials can also be used. The welding element 10 is produced for example by cold forming, and the projections 26 are produced during the cold forming. The projections are formed for example by embossing.

The welding element can be produced in several steps. For example, the surface is extruded in a first step. In a second step, a pressing operation can be carried out on the welding diameter. In a third step, the "waffle-shaped pattern" (or the projections 26) can be pressed, for example using an embossing tool.

The welding element 10 is designed to be in one piece or to be monolithic, and therefore in particular the anchor portion 12 and also the head 14 comprising the corresponding projections 26 are produced from one component (or workpiece) in order to form the welding element 10.

In other embodiments, the welding element 10 could have multiple parts.

The welding element 10 is suitable for being connected to a workpiece 38 by a welding method (in particular by arc welding). The workpiece 38 is for example a vehicle body sheet and comprises a first surface 40 and a second surface 42, and has a sheet thickness Tb. The workpiece 38 can be made of various weldable materials, such as metal or alloys, or other materials.

The first surface 40 comprises a connection portion 44. A zinc layer (or another surface layer, such as a coat of paint, a corrosion protection layer, etc.) can for example be provided on the second surface 42 of the workpiece 38.

In a first step, the welding element 10 is arranged in the region of the connection portion 44. In the process, the projections 26 and in particular a (distal) point 28 of the projections 26 come into contact, at least in portions or in part, with the connection portion 44 of the workpiece 38. The contact zone between the workpiece and the welding element, which occurs on account of the point 28, is however distributed over a plurality of point contacts and is not continuous. This allows for improved distribution of the compressive force over the entire welding surface when the welding element 10 is placed on the workpiece 38. The anchor portion 12 extends away from the stop surface 24 of the head 14 of the welding element 10.

The welding element 10 and the workpiece 38 are each connected via power lines to a power source in order to be supplied with electricity. The projections 26 being arranged with or coming into contact with the connection portion 44 of the workpiece 38 results in a closed current circuit, by means of which an arc can be formed. A bias current and a main current are used in welding methods of this kind. The voltage required for the welding process is dependent on the materials of the welding element and the workpiece 38, and on the size of the elements.

The welding element 10 is initially placed on the workpiece 38. The bias current is activated upon the placement (or thereafter). The direct contact zone between the welding element 10 and the workpiece 38 (i.e. the contact zone between the point 28 and the workpiece 38) heats up as a result of the current flow. The main current is then activated in order to begin the melting phase. This is initialised by the joining zone. The welding element is pressed against the workpiece 38. The connection takes place by means of crystallisation of the melt.

The welding region is expanded by the geometry of the welding surface 22 (i.e. by the projections). The projections allow for effective distribution of the welding energy over the entire welding surface. The shape allows the melting to spread from the point of the projection as far as the base. The shape of the projections allows for even distribution of the melting over the entire welding surface, and for a reasonably constant melting depth of the head. The points are to be melted in particular at the beginning of the welding process. The welding energy will then be distributed in the projections along the longitudinal axis Xa towards the stop surface. The melting spreads along the longitudinal axis Xa over the entire welding surface as far as the flat plane on which the bases of the projections are arranged. The evenly distributed pointed projections ensure that the arc burns stably on the welding surface. Uncontrolled, outward arc migration can thus be avoided.

The welding method (in particular the parameters of the welding method, such as the required energy and the length of the process) can be selected such that only the points 28 (or a specific projection height Hv) of the projection 26 are melted. This can suffice in order to produce a joined connection between the welding element 10 (or welding stud) and the workpiece 38 having a thin sheet thickness, without through-welding. The welding method (in particular the parameters of the welding method, such as the required energy and the length of the process) can also be selected such that all the projections 26 and part of the support are melted. In particular, the depth of the support that is melted is dependent on the sheet thickness.

The thickness of the sheet can be for example between 0.5 and 3 millimetres. For example, the thickness of the sheet can be between 0.5 and 2 millimetres. Thin sheets preferably have a thickness of between 0.5 and 0.7 millimetres. Thick sheets preferably have a thickness of between 0.8 and 2 millimetres. When welding thick materials (sheet), the processing energy is increased and/or the welding time is prolonged in order to achieve sufficient melting of the parts to be joined, and to thus produce a satisfactory connection.

A control apparatus is provided in order to control the parameters of the welding method automatically depending on the thickness of the workpiece 38. In particular, the thickness of the workpiece 38 is measured by a sensor, and the voltage of a welding device 46 is controlled by the control apparatus such that through-welding of the workpiece is avoided and the welding is optimised.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A welding element weldable to a workpiece, wherein the welding element comprises:
   a head including a welding surface, a stop surface that is remote from the welding surface, and a plurality of pointed projections evenly and uniformly distributed over and covering the entire welding surface; and
   a shaft-portion which extends along a longitudinal axis (Xa) between a first end region and a second end region, the first end region connected to the stop surface.

2. The welding element according to claim 1, wherein the plurality of projections extend along a plurality of straight lines uniformly distributed over the welding surface.

3. The welding element according to claim 1, wherein the plurality of projections are oriented in parallel rows and separated by two groups of intersecting grooves, wherein the grooves of the first group extend parallel to each other, wherein the grooves of the second group extend parallel to each other, and wherein the grooves of the first group are perpendicular to the grooves of the second groove.

4. The welding element according to claim 1, wherein the welding surface forms a bulge, and wherein the plurality of projections are arranged on the bulge.

5. The welding element according to claim 4, wherein the bulge has a circular radial cross section, and wherein the bulge is centered on the longitudinal axis.

6. The welding element according to claim 1, wherein each projection of the plurality of projections has a pyramid shape with a square base.

7. The welding element according to claim 6, wherein each projection comprises four flat lateral surfaces that form a point of the projection, and wherein two opposing lateral surfaces define an interior angle ($\alpha$) of between 75 to 85 degrees.

8. The welding element according to claim 1, wherein each projection of the plurality of projections have a projection height (Hv) of between 0.3 to 1.0 millimetres (mm).

9. The welding element according to claim 7, wherein the points of two adjacent projections are mutually spaced by between 0.5 millimetres and 2.0 millimetres.

10. The welding element according to claim 1, wherein the welding surface is an annular surface and partially defines a central recess in the head.

11. A method for welding a welding element to a workpiece, the method comprising the following steps:
    providing a welding element comprising:
      a head including a welding surface, a stop surface that is remote from the welding surface, and a plurality of pointed projections evenly and uniformly distributed over and covering the entire welding surface; and
      a shaft portion which extends along a longitudinal axis (Xa) between a first end region and a second end region, the first end region connected to the stop surface;
    providing a workpiece comprising a first surface and a second surface, and defining a sheet thickness (Tb),
    providing an arc welding device,
    arranging the welding surface of the welding element on the first surface of the workpiece,
    actuating the arc welding device,
    arc welding the welding element to the workpiece by melting at least some of the projections and pressing the welding element against the workpiece.

12. The method of welding according to claim 11, wherein the projections have a projection height (Hv) along the longitudinal axis (Xa), and the method further includes the step of selecting the welding element with the projection height (Hv) on the basis of the sheet thickness (Tb).

13. The method of welding according to claim 11, wherein the workpiece includes a zinc layer on the second surface.

14. A welding element weldable to a workpiece, wherein the welding element comprises:
    a head including a welding surface, a stop surface that is remote from the welding surface, and a plurality of pointed projections evenly and uniformly distributed over and covering the entire welding surface, and each projection of the plurality of pointed projections has a pyramid shape with a square base; and
    a shaft portion which extends along a longitudinal axis (Xa) between a first end region and a second end region, the first end region connected to the stop surface.

15. The welding element according to claim 14, wherein each projection comprises four flat lateral surfaces that form a point of the projection, and wherein two opposing lateral surfaces define an interior angle ($\alpha$) of between 75 to 85 degrees.

16. The welding element according to claim 15, wherein the points of two adjacent projections are mutually spaced by between 0.5 millimetres and 2.0 millimetres.

17. The welding element according to claim 14, wherein the plurality of projections extend along a plurality of straight lines uniformly distributed over the welding surface.

18. The welding element according to claim 14, wherein the plurality of projections are oriented in parallel rows and separated by two groups of intersecting grooves, wherein the grooves of the first group extend parallel to each other, wherein the grooves of the second group extend parallel to each other, and wherein the grooves of the first group are perpendicular to the grooves of the second groove.

19. The welding element according to claim 14, wherein the welding surface forms a bulge, and wherein the plurality of projections are arranged on the bulge.

20. The welding element according to claim 19, wherein the bulge has a circular radial cross section, and wherein the bulge is centred on the longitudinal axis.

21. The welding element according to claim 14, wherein each projection of the plurality of projections have a projection height (Hv) of between 0.3 to 1.0 millimetres (mm).

22. The welding element according to claim 14, wherein the welding surface is an annular surface and partially defines a central recess in the head.

* * * * *